United States Patent
Lemons

[19]

[11] Patent Number: 5,879,498
[45] Date of Patent: Mar. 9, 1999

[54] METHOD OF LINING FLUID VESSELS

[75] Inventor: Carl R. Lemons, Westminster, Calif.

[73] Assignee: McDonnell Douglas Corporation, St. Louis, Mo.

[21] Appl. No.: 946,704

[22] Filed: Oct. 8, 1997

Related U.S. Application Data

[60] Provisional application No. 60/027,980 Oct. 8, 1996.
[51] Int. Cl.$^6$ ..................................................... B32B 31/00
[52] U.S. Cl. .......................... 156/152; 156/182; 156/231; 156/239; 156/243; 156/244.22; 156/244.24; 156/247; 156/295; 156/307.7; 156/308.2; 156/322; 156/327; 264/175; 427/154
[58] Field of Search ................................ 427/154; 156/66, 156/152, 182, 231, 239, 243, 244.22, 244.24, 247, 295, 307.7, 308.2, 322, 327; 264/175

[56] References Cited

PUBLICATIONS

*Process Engineering News*, New in Urethane Elastomers: Non–MOCA Systems and Novel Coprepolymers, pp. 27, 29 and 43 (Aug., 1980).

*Primary Examiner*—Bernard Pianalto
*Attorney, Agent, or Firm*—Bell Seltzer Intellectual Property Law Group of Alston & Bird LLP

[57] ABSTRACT

A barrier liner for sealing reinforced composite vessels at cryogenic temperatures is provided wherein the barrier liner is composed of a polymeric composition containing a curing agent, such as a methyl bis-methyl anthranilate, and an elastomer adhesive, such as a two-part polyether based urethane adhesive. A method of manufacturing and applying the barrier liner is also provided, including the steps of mixing and degassing the polymeric composition and introducing the polymeric composition between two polyethylene carrier sheets. The two carrier sheets and the intermediate polymeric composition layer are then passed between two sizing rollers set apart at a predetermined distance. The encapsulated polymeric composition is then partially cured to a tacky gel state and cooled to arrest polymerization until application of the gel layer. The gel layer and the two carrier sheets can then be cut into any desired shape such as strips, and applied to the inner surface of a vessel. The interior wall of the vessel may be heated prior to application of the gel layer. To apply the polymeric gel layer, one of the carrier sheets is removed to expose a tacky surface of the polymeric gel layer which is then applied to the vessel wall. When application of the polymeric gel layer is complete, the gel layer may be fully cured at ambient temperature and pressure to form a hardened barrier liner which is capable of maintaining a barrier to fluids at cryogenic temperatures.

22 Claims, 3 Drawing Sheets

METHOD OF LINING FLUID VESSELS

CROSS-REFERENCE TO RELATED APPLICATIONS

This application claims the benefit of U.S. Provisional No. 60/027,980, filed Oct. 8, 1996.

FIELD OF THE INVENTION

This invention relates in general to certain new and useful improvements in barrier liners for fluid containing vessels, and more particularly, to a barrier liner for use with reinforced composite vessels for containing cryogenic fluids.

BACKGROUND OF THE INVENTION

In recent years, pressure vessels and particularly pressure vessels which are used under wide temperature ranges, have been constructed of various filament reinforced composites. As a simple example, many pressure vessels are constructed with reinforced plastic composites of epoxy resins and fibrous materials such as glass, boron, carbon or the like. The reinforced plastic composite materials are highly effective in the formation of pressure vessels due to the fact that they have a high strength capable of withstanding large pressure and temperature changes, and they are of significantly lighter weight than pressure vessels formed of metals such as steel, aluminum, or the like. Reinforced composite materials are frequently used for vessels exposed to outer space environments, such as on rockets, and are proposed now for use in space station equipment. The use of a filament wound composite material is also ideal for manufacturing very large vessels, that is, vessels over 10 feet in diameter and vessels of even larger size. However, vessels of this type lack the requisite barrier properties without further treatment or processing.

More particularly, one of the disadvantages of reinforced composite vessels is the existence of a microporosity which becomes pronounced at low temperatures. The microporosity can result during the initial manufacturing operations of fiber compaction and resin curing. Porosity can also result from cyclic pressure loading of the composite structures in service. However, in the minds of most researchers, the thermal properties and the mechanical properties of the fibers which are used and of the resin matrices which are employed are so widely divergent that micro-cracking between the fiber and the matrix is inevitable. When the vessel is used to contain cryogenic fluids, such as hydrogen fuel at −423° F., thermal micro-cracking becomes increasingly problematic. Liquid hydrogen is a particularly difficult substance to contain under low temperature conditions. Due to the fact that the hydrogen molecule is a very small molecule, there is a great tendency for this fluid to weep through the vessel wall, thus resulting in a loss of material.

In order to overcome the microporosity problem, others have attempted to use liners in these reinforced composite pressure vessels. The search for an effective barrier material for filament wound pressure vessels started as early as the 1950's when rubber bladders were used simply to allow the vessel to be hydrostatically proof-tested. Thereafter, others have attempted to use the rubber bladders as a type of liner. Some fabricators in the design of pressure vessels, such as water tanks, used seamless spun aluminum liners that were over-wound with filaments and resin binders and then left in place during service operation. There were many research efforts to find suitable film barrier materials using Mylar, Tedlar, Kapton or acrylonitrile-butadiene to prevent leakage. However, none of the above described materials possesses the required elasticity at cryogenic temperatures, such as −423° F., the liquidation point of hydrogen.

There are many liquid polymeric formulations which can be sprayed in place, rolled on in liquid form, or applied by brush. However, all of these polymers and their application methods result in the inclusion of air bubbles and pinholes in the resultant liner. Most frequently, these air bubbles and pinholes cannot be seen and only appear under the stress of extreme temperature conditions. Further, these liners cannot be sealed air or liquid tight when pressure tested.

In addition, other films have been proposed which use an adhesive B-stage film. These films do not possess sufficiently elastic properties at cryogenic temperatures and also require high temperatures and pressures to fully cure the film. To apply the requisite pressures and temperatures, the structure is usually placed in a high temperature pressurizing device, such as an autoclave. Such an approach is impractical, however, when working with large tank structures, such as those having a diameter of 50 feet or greater, which will not readily fit into an autoclave. In addition, even when using an autoclave, the pressure may not be sufficient to remove air bubbles from beneath the film.

Thus, there is a need for an effective technique for sealing reinforced composite pressure vessels, particularly when subjected to pressure and temperature variations of the type encountered in space applications. There is a need for a barrier liner material for reinforced composite fluid vessels which remains fully sealed, even under pressurized cryogenic conditions. In addition, it would be desirable to provide an easy and effective method of applying the liner to a vessel wall, even for very large tank structures.

SUMMARY OF THE INVENTION

The present invention provides these and other objects and advantages and is directed to a barrier liner for use in cryogenic fluid storage vessels and a method of preparing and applying such a barrier liner. The present invention provides a polymeric barrier liner with the elasticity necessary to seal composite pressure vessels at cryogenic temperatures. The barrier liner does not require the use of solvents, diluents or additional adhesives and is capable of bonding to the inner surface of the vessel with only ambient or manual pressure during application.

The barrier liner of the present invention is formed by advancing a pair of carrier films towards a pair of sizing rollers spaced apart by a predetermined distance. A mixture of a polymeric adhesive and a curing agent is degassed and then introduced between the carrier films as the films are advanced towards the sizing rollers. As the two carrier films and the intermediate polymeric composition pass between the sizing rollers, the polymeric composition is compressed to a predetermined thickness between the carrier films. The encapsulated polymeric composition is then partially cured to form a gel layer having a predetermined level of tackiness. The gel layer should have a Shore hardness of about 15A to 20A. After the polymeric gel layer is partially cured, polymerization is arrested by cooling the polymeric gel to about 40° F. for short term storage or 0° F. for long term storage.

The polymeric gel layer and carrier films can be cut into strips or other suitable shapes before applying the gel layer to the vessel wall. One of the carrier films is then removed to expose a tacky surface of the polymeric gel layer. The exposed tacky surface of the polymeric gel layer is then applied to the inner surface of the vessel so that the gel layer is adhered to the vessel. Preferably, the gel layer and carrier films are cut into strips and applied in a laterally adjacent arrangement with an edge of each strip overlapping an edge of an adjacent strip to form a continuous liner. The remaining carrier film may remain on the polymeric gel layer and can be walked upon during the application of other sections of the gel layer.

The inner surface of the vessel wall is prepared for application of the barrier liner by grit blasting to remove resinous gloss and by applying a rub coat to the inner surface of the vessel. The rub coat comprises liquid polymeric adhesive. The rub coat is cured prior to application of the barrier liner. The inner surface of the vessel is also warmed prior to application of the barrier liner.

Once the polymeric gel layer has been applied to the inner surface of the vessel wall, pressure can be manually applied to the second carrier film using soft rollers to facilitate adhesion and to force any air bubbles between the polymeric gel layer and the inner surface of the vessel to migrate to the edge of the barrier liner for removal from the barrier liner. After the polymeric gel layer has been applied to the vessel, the gel layer is fully cured at ambient pressure to form a barrier liner with a Shore hardness of about 90A to 92A securely adhered to the inner surface of the vessel and which can prevent leakage of fluids at cryogenic temperatures of as low as $-423°$ F. The curing of the barrier liner can be accelerated by raising the temperature of the vessel wall.

The polymeric composition used to form the barrier liner of the present invention is preferably made of an elastomer adhesive and a curing agent. The preferred elastomer adhesive is a two-part polyether based urethane adhesive and the preferred curing agent is methylene bis-methyl anthranilate. The carrier films are preferably constructed of substantially transparent polyethylene.

BRIEF DESCRIPTION OF THE DRAWINGS

Figure 1:
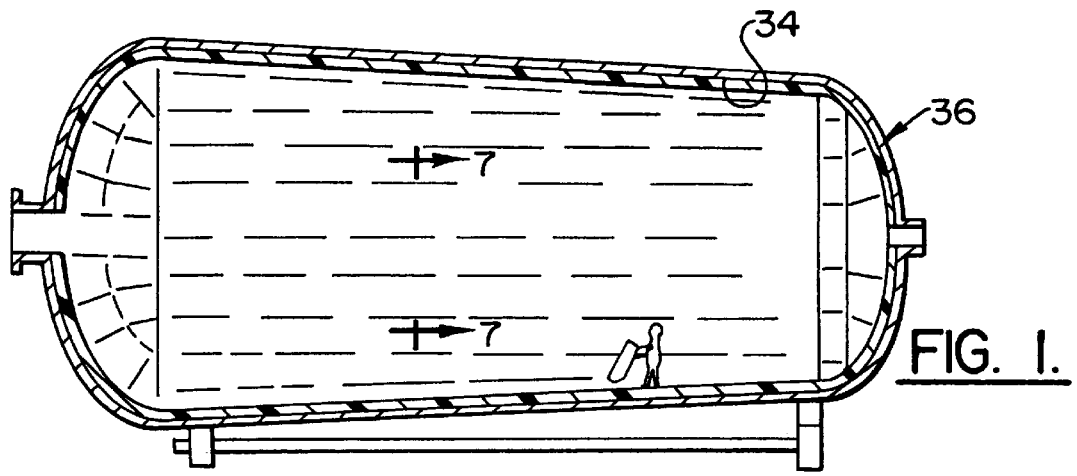
Figure 2:
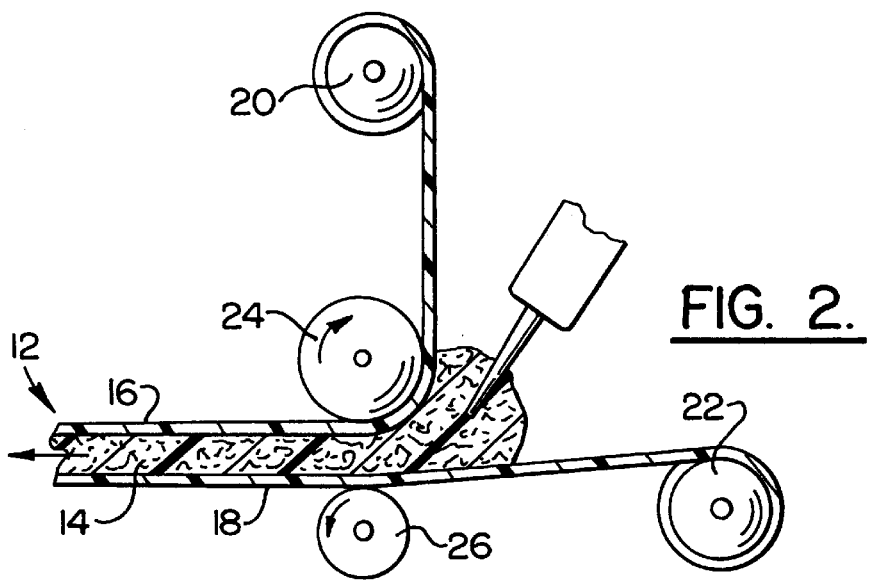
Figure 3:
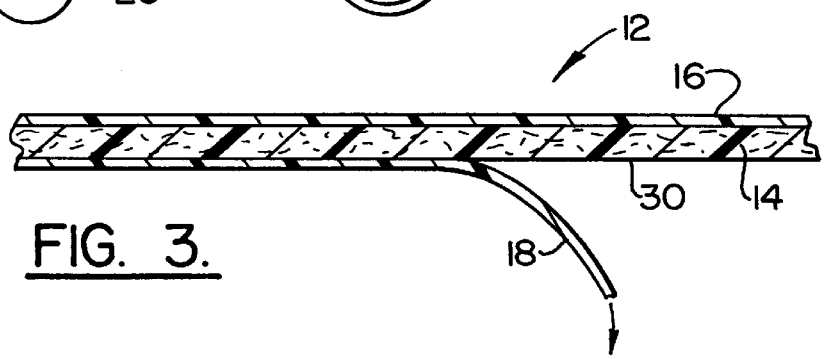
Figure 4:
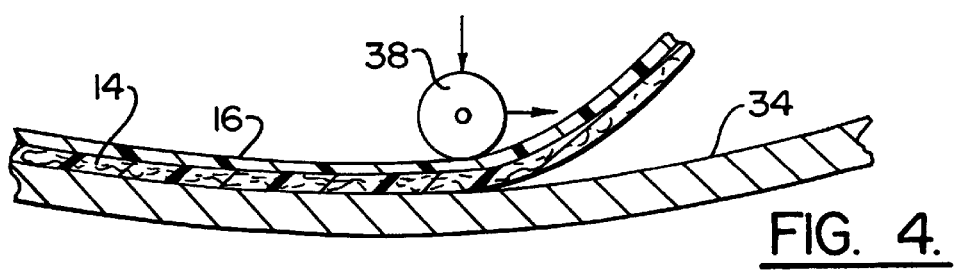
Figure 5:
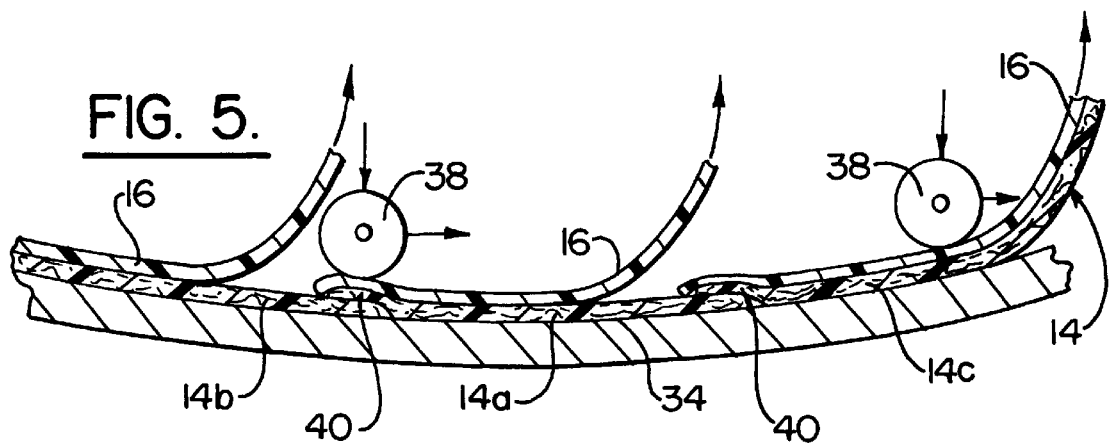
Figure 6:
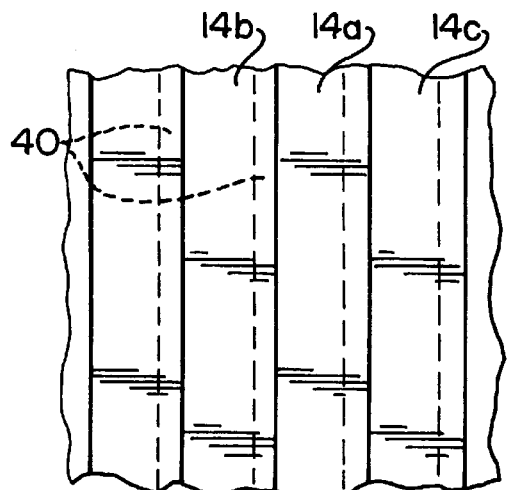
Figure 7:
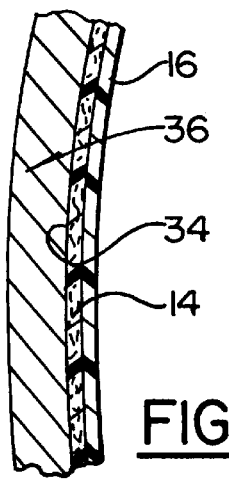
Figure 8:
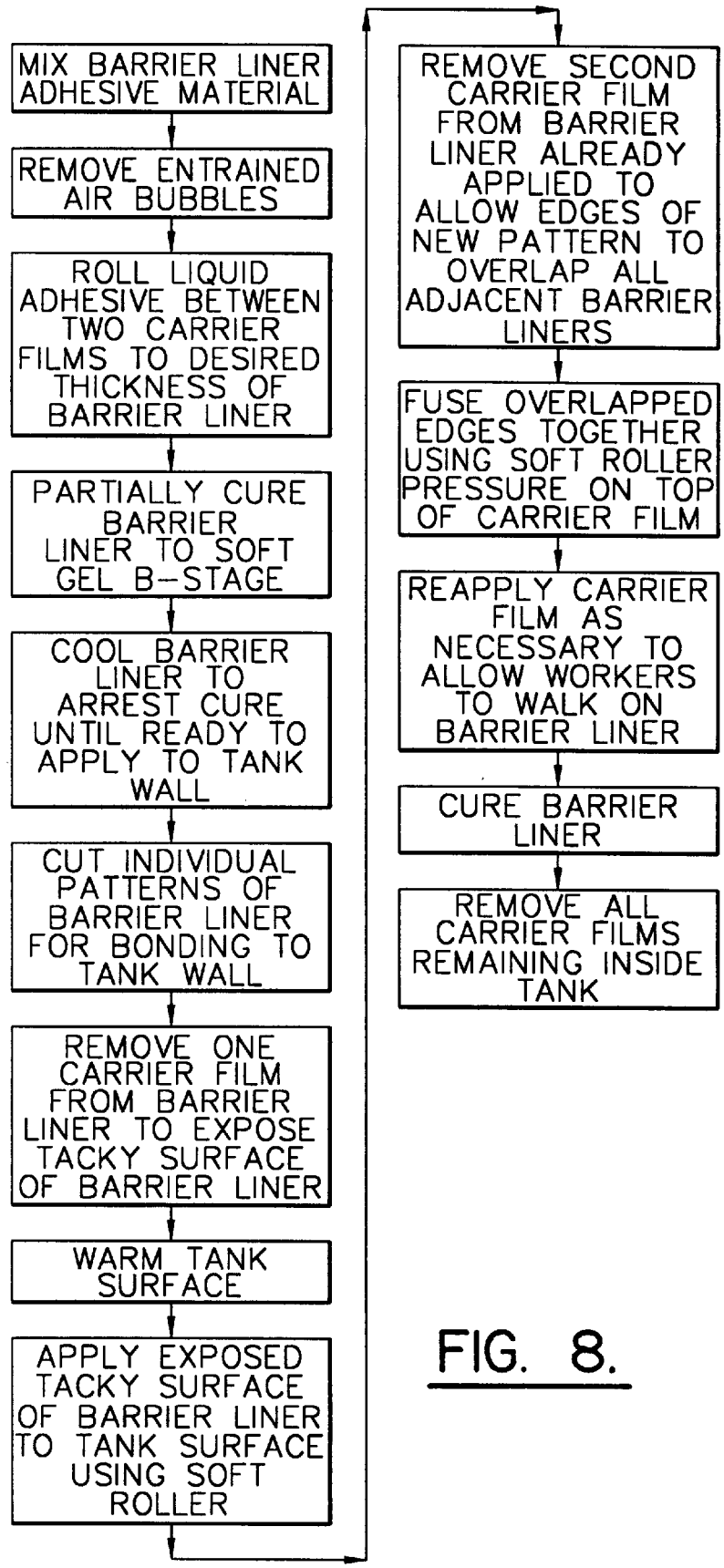

Having thus described the invention in general terms, reference will now be made to the accompanying drawings, which are not necessarily drawn to scale, and wherein:

FIG. 1 is a sectional view of a pressure vessel having a cryogenic barrier liner of the present invention applied thereto;

FIG. 2 is a sectional view showing the formation of a barrier liner assembly of the invention having a barrier liner with a pair of carrier films applied thereto;

FIG. 3 is a sectional view showing the removing of one carrier film from the barrier liner assembly;

FIG. 4 is a sectional view showing the application of a barrier liner to the inner surface of a vessel;

FIG. 5 is a sectional view showing the application of a plurality of barrier liner strips to an inner surface of a vessel with the bonding of overlapping edges of each of the strips on the vessel wall;

FIG. 6 is a plan view showing a plurality of barrier liner strips applied in side-by-side relationship with bonding of overlapping edges thereof;

FIG. 7 is a sectional view of the wall of the pressure vessel illustrating the first carrier film remaining in place; and FIG. 8 is a flow chart showing the steps involved in performing the method of the present invention.

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

The barrier liner of the present invention is ideally suited for use with composite pressure vessels comprised of reinforced plastic composite materials, an example of which is illustrated in FIG. 1. In a preferred embodiment of the present invention, the cryogenic barrier liner is applied to fiber reinforced composite pressure vessels comprising strands of reinforcing fiber material impregnated with a suitable matrix and then cured. Reinforced plastic composite pressure vessels of the aforementioned type are often formed of fiber reinforcing materials such as glass, boron, carbon, which may be applied to a vessel wall in the form of various known tows, rovings, tapes, and the like. The pressure vessels are impregnated and cured with a suitable resin matrix of a thermosetting or thermoplastic resin. Some of the resin materials which may be employed for this purpose include epoxies, bis-maleimides, and phenolic resins. Some known thermoplastic resins include amides (nylon), polycarbonates (Lexan) or the high temperature resistance types such as polyether ether ketone (PEEK).

Although the barrier liner of the invention has been adapted for use with reinforced composite pressure vessels, it is by no means so limited. This barrier liner can be used with other types of vessels formed of plastic materials, metals and the like. Moreover, the barrier liner of the present invention is highly effective with, although not limited to, use with pressure vessels operating at low temperatures, such as are encountered with cryogenic fluids. In addition, the term "vessel" is used in a broad sense to include all types of vessels, as for example, fuel tanks, fluid delivery lines, and the like. In the case of a space vehicle, all vessels which receive the low temperature liquid would require a barrier lining.

FIG. 8 illustrates the various steps, in schematic form, which are involved in the process of both forming the barrier liner and applying the liner to a vessel wall. Initially it should be noted that, unlike existing commercial processes where barrier films are premanufactured, each step in the process of the present invention relating to forming and applying the barrier liner can be monitored for compliance with quality requirements before the next step is initiated.

The first step in the process of forming the barrier liner of the present invention is to mix the components of the barrier liner-forming material by any conventional technique known in the art. The barrier liner of the present invention is preferably comprised of a polymeric composition containing a thermosetting two-part polyether-based urethane adhesive and a non-MOCA hardener or amine curing agent mixed therewith. A particularly preferred polyurethane adhesive is Crest 7450, a commercially available product from Crest Products of Fountain Valley, Calif. However, other polyether or polyester based polyurethane elastomers or other elastomeric compounds that remain resilient under cryogenic temperatures and also provide the adhesive properties (non-cracking and non-peeling) that are required at cryogenic temperatures or other service temperatures could be used with this process. The adhesive should be one which is capable of causing a polymerization of the adhesive to a final cure and not one which relies upon solvent evaporation for hardening. Thus, for example, many of the vinyl adhesives are not applicable since they require any of a number of evaporatable solvents. The urethane which is employed, is actually a precursor in the form as used and is particularly effective because of its known elastic properties. The preferred curing agent is methylene bis-methyl anthranilate.

The adhesive should have a 100 percent solids content. In other words, although the precursor adhesive is liquid, it should be liquid in 100% solids polymerization form, completely free of diluents, solvents or inhibitors. If solvents, or other volatile compounds, are present in the barrier liner during curing, evaporation will occur. Evaporation can lead to the formation of pinholes or bubbles in the barrier liner, thereby resulting in poor sealing at cryogenic temperatures. In the art, adhesives which are in a liquid state but contain no evaporatable component and which completely polymerize to a C-stage are typically referred to as 100 percent solids content adhesives.

When the curing agent is added to the urethane, the composition will start to cure toward a B-stage, that is, a stage in which the material is no longer in a pure liquid form, but is in a gel form. In this gel form, the material is pliable and can be formed to a particular configuration, as for example, the configuration of the interior surface of the vessel, having surface contour irregularities such as mold marks, ridges and steps. The barrier liner can also extend around sharp corners and still maintain the desired film thickness and an effective cryogenic seal. Additionally, the barrier liner has sufficient tackiness in the gel-like stage to bond to the inner surface of the vessel wall without needing additional adhesives or high pressure conditions during application. The barrier liner of the present invention is capable of maintaining this bond strength at cryogenic surface temperatures of as low as −423° F. without additional adhesive layers. Additionally, the barrier liner is capable of maintaining bond strength at elevated temperatures of at least 250° F.

Once the adhesive ingredients are mixed in liquid form to form a polymeric composition, it is important to ensure that there are no voids or air bubbles contained within the composition. As a result, the barrier liner-forming material is subjected to a degassing or outgassing operation. Any conventional outgassing procedure may be employed for this purpose. An automatic metering and mixing machine with continuous vacuum outgassing devices is preferred for continuous operations. However, vacuum outgassing in a conventional bell jar is an acceptable technique for batch operations.

Once the adhesive barrier liner-forming material has been mixed and any entrained air bubbles have been removed, the barrier liner may be further processed. The barrier liner of the present invention typically is provided as a barrier liner assembly 12 in a sandwiched arrangement, as shown in FIG. 3. The assembly is typically comprised of the polymeric gel layer 14 encapsulated between outer removable carrier films 16 and 18. Moreover, these carrier films 16 and 18 are peelable and therefore completely removable from the polymeric gel layer 14 much in the manner as shown in FIG. 3.

FIG. 2 more fully illustrates the actual formation of the barrier liner in accordance with one embodiment of the present invention. In the arrangement as shown in FIG. 2, the polymeric composition is introduced between a pair of carrier films 16 and 18 which are unspooled from reels 20 and 22, respectively. The two films 16 and 18 with the polymeric composition 14 injected therebetween are passed between a pair of precision sizing rollers, 24 and 26, which are preferably steel sizing rollers. In this way, the thickness of the barrier liner is predetermined by the spacing between the rollers 24 and 26. An optimum thickness of the gel layer 14 is about 15 mils, although a thickness of 60 mils has also been used. A preferred range is between about 5 mils to about 75 mils.

Both the films 16 and 18 are preferably formed of a suitable thin plastic film material such as polyethylene, polypropylene, fluorocarbons (Aclar), polyvinylidene fluoride (PVF Tedlar) or the like. Thin lightweight polyethylene is the preferred material for the removable carrier films 16, 18. The thickness of the carrier film is preferably about 4.0 mil. In the preferred embodiment, the carrier films 16, 18 are substantially transparent so that any bubbles trapped underneath the barrier liner can be seen and eliminated.

Very frequently, when forming the barrier liner assembly 12, as shown in FIG. 3, the polymeric composition is in an A-stage or at least a partially liquid stage. In order to permit handling of the barrier liner during application to the vessel wall, the polymeric composition must be advanced to the soft gelled stage or B-stage. Once the polymeric composition 14 is placed between the carrier films 16 and 18, the polymeric composition can be allowed to polymerize to a gelled stage by subjecting the polymeric composition to temperatures between about 60° F. and about 80° F. The gel layer 14 will preferably exhibit a hardness of about Shore 15A to 20A. At that stage, the polymeric gel layer 14 will exhibit the desired tackiness and firmness necessary for ease of application. In order to preclude or at least partially arrest any further curing of the polymeric gel layer 14 beyond the B-stage, the assembly 12 may be cooled or chilled. Moreover, it is desirable to maintain the gel layer 14 in a relatively cool state to preclude any further gelling or curing until it is desired to apply the gel layer 14 to the inner surface 34 of the vessel 36. The temperature can be reduced to about 0° F. for long-term storage or to about 40° F. for shorter periods in order to arrest polymerization of the gel layer 14.

The gel layer 14 of the present invention is preferably of a predetermined thickness prior to bonding to a vessel surface. For this purpose, the gel layer 14 is usually, although not necessarily, prepared in the form of strips 14a, 14b, 14c, with each strip having the selected and controlled predetermined thickness. The term "strip" as used herein also includes various patterns based on the tank geometry. In the formation of the individual strips 14a, 14b, 14c, the gel layer 14 is cut along with the two outer carrier films 16, 18 remaining intact on either side of the gel layer. For purposes of convenience of application and handling, the barrier liner assembly 12 can be provided in the form of elongate individual strips which can be uncoiled from rolls thereof. In this way, a plurality of individual strips 14a, 14b, 14c can be applied, much in the manner as shown in FIG. 6. The barrier liner of the present invention can thus be readily applied to vessels of widely varying sizes, including very large diameter vessels, by cutting the barrier liner assembly 12 into appropriately sized and shaped strips.

Once curing of the gel layer 14 has been arrested in the gel-like stage and the barrier liner assembly 12 has been cut into the desired pattern, one of the carrier films, such as the lower film 18, can be peeled off to expose a tacky undersurface 30 of the gel layer 14, as illustrated by FIG. 3. This tacky undersurface 30 provides a surface which can be applied and adhered to a vessel wall.

To prepare the inner surface 34 of the vessel 36 for application of the gel layer 14, the natural resinous gloss of the composite vessel surface is removed by light grit blasting. Also, to achieve a high affinity to the barrier liner, the vessel surface is advantageously given a rub coat by applying about 1 to 2 grams of liquid polymeric adhesive per square foot of the inner surface 34 of the vessel 36. Preferably, Crest 7450 urethane adhesive is used for the rub coat. This rub coat is then allowed to cure at ambient temperature and pressure before applying the barrier liner.

The curing rate can actually be controlled during the application of the barrier liner to the vessel wall. By heating the polymeric gel layer 14 or heating the inner surface 34 of the vessel 36, the curing rate is increased. Conversely, cooling the gel layer 14 or cooling the inner surface 34 of the vessel 36 will reduce the curing rate. In the preferred embodiment, the vessel wall is warmed prior to the application of the barrier liner.

The exposed tacky surface 30 of the gel layer 14 is then applied to the warmed interior surface 34 of the vessel 36 using soft rollers, such as the roller 38, as shown in FIGS. 4 and 5 of the drawings. Although FIG. 4 illustrates the use of a soft roller 38 for applying the barrier liner 14 directly to the interior surface 34 of a vessel, the barrier liner, in certain instances, could be applied to the outer surface of the vessel or even between the plies of a composite vessel.

The outer carrier film 16 remains on the gel layer 14 when the latter is applied to the interior surface 34 of the vessel 36. Only hand or manual rolling pressure is needed to apply the gel layer 14 to the vessel wall. Manual pressure is intended to encompass application of physical pressure by means of soft rollers or by hand or feet. No additional bonding pressure is required. As such, there is no need to place the barrier liner and vessel in an autoclave to bond the gel layer 14 to the vessel wall. This is a great advantage over conventional barrier liners, which must be pressurized and heated in an autoclave while in place on the vessel wall and thus cannot be used to line very large tanks. The barrier liner of the present invention is thus curable at ambient pressures.

Since the carrier films 16 and 18 are substantially transparent, any air bubbles present in or under the barrier liner can be detected, worked to the edge of the barrier liner using hand or roller pressure, and eliminated. Also, the soft roller 38 can be used to mold the gel layer 14 around compound contour surfaces (such as domes) and surface irregularities in the vessel wall without edge wrinkling. In addition, in the gel stage, the barrier liner has a walk-on capability during the application thereof. In this way a plurality of workers who are applying the barrier liner to a large vessel can walk on the barrier liner.

Referring to FIG. 5 and FIG. 6, it can be seen that each strip 14a, 14b, 14c of the barrier liner will overlap to form a continuous vessel lining. As this occurs, it can be seen that one strip of barrier liner 14a will have an overlapping edge 40 on another barrier liner strip 14b, as shown in FIG. 5. In like manner, a third strip 14c also has an overlapping edge 40 with respect to the barrier liner strip 14a. Using only manual application of hand or soft roller pressure, the overlapping edges can be pressed and fused together such that, when the gel layer is fully cured, the gel layer 14 will form a seamless fused seal and a substantially flat liner on the interior surface 34 of the vessel wall.

In some cases, both of the plastic carrier films 16 and 18 are completely removed during the application of the gel layer 14. In this way, the edges can be more easily overlapped as discussed above. However, if desired, the outer carrier film 16 can be reapplied if desired. In this way, with the carrier film 16 reapplied to the gel layer, workers may be permitted to walk on the partially cured barrier liner assembly in order to gain access to other portions of the barrier liner and continue the bonding operation.

The gel layer 14 may then be cured at ambient temperature and pressure to the C-stage where it is a completely rigid barrier liner having a hardness of about Shore 90A to 92A. Ambient temperature is defined as between about 60° and 80° F. Ambient curing takes about 7 days. Alternatively, the gel layer 14 may be postcured by raising the temperature of the tank wall to about 160° F. for about 14 to 16 hours, which shortens the curing process. Before elevated temperature curing, however, the carrier film 16 should be removed.

FIG. 1 shows a plurality of strips of the barrier liner of the present invention applied to the inner surface 34 of a large diameter vessel 36. In this particular case, the barrier liner is supplied through an access opening in the vessel wall to work personnel on the inside of the vessel who then apply the various strips to the vessel wall, in the manner as shown.

FIG. 7 is a cross-sectional view of the barrier liner applied to the inner surface 34 of the vessel 36. In the application of the barrier liner material, it is possible to leave the protective carrier film 16 on the exterior surface of the barrier liner 14 during work in the vessel, or otherwise, it can be removed. As noted above, the exterior carrier film 16 can remain in place when work personnel are located in the vessel.

The barrier liner of the present invention is quite compatible with many other adhesives that might be desired for use in bonding items to the inner surface of a vessel. One example is the rigid epoxy adhesive used to bond thermal insulation. Internal insulation, liquid slosh control baffles, electric wiring brackets, and other additions to the interior of the tank may be bonded directly to the cured barrier film of the present invention.

The barrier liner of the present invention possesses the elasticity necessary to provide a nonporous, sealing barrier liner at cryogenic temperatures, such as $-423°$ F., the liquidation point of hydrogen. The barrier liner of the present invention is also highly effective for vessels which will be used in an outer space environment and where temperature swings can be quite substantial. Particularly, in the case of storing liquid hydrogen, the hydrogen must be stored at a temperature of at least $-423°$ F. in order to maintain liquidation in an outer space environment. However, in the case of a vehicle which may return from a space environment to a terrestrial environment, during the re-entry path, portions of that space vehicle may reach temperatures of or exceeding 250° F. for a short period of time. Thus, the barrier liner is preferably capable of withstanding the temperature variations from at least $-423°$ F. to 250° F. or greater for at least short periods of time.

Many modifications and other embodiments of the invention will come to mind to one skilled in the art to which this invention pertains having the benefit of the teachings presented in the foregoing description and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed is:

1. A method of forming a barrier liner for a fluid pressure vessel capable of withstanding cryogenic temperatures, wherein said method comprises the steps of:

advancing a first carrier film towards a first sizing roller;

advancing a second carrier film towards a second sizing roller spaced from the first sizing roller by a predetermined distance;

mixing together a polymeric adhesive and a curing agent to form a viscous polymeric composition which will become a barrier to low temperature fluids upon hardening;

introducing the polymeric composition between the first and second carrier films as the films are advanced towards the sizing rollers;

advancing the first and second carrier films and intermediate polymeric composition between the sizing rollers to compress the polymeric composition to a predetermined thickness between the carrier films;

partially curing the polymeric composition to form a gel layer having a predetermined level of tackiness;

removing the first carrier film to expose a tacky surface of the polymeric gel layer;

providing a fluid pressure vessel capable of withstanding cryogenic temperatures;

applying the exposed tacky surface of the polymeric gel layer to a surface of the vessel so that the gel layer is adhered to the vessel;

removing the second carrier film to expose the opposite surface of the polymeric gel layer; and fully curing the polymeric gel layer at ambient pressure to form a hard barrier liner securely adhered to the surface of the vessel and impermeable to fluids at cryogenic temperatures.

2. A method according to claim 1, further comprising the step of cooling the polymeric gel layer to arrest polymerization after said partially curing step.

3. A method according to claim 1, wherein said fully curing step comprises curing the polymeric gel layer to a Shore hardness of about 90A to 92A.

4. A method according to claim 1, wherein said partially curing step comprises curing the polymeric composition to a Shore hardness of about 15A to 20A.

5. A method according to claim 1, further comprising the step of manually applying pressure to the polymeric gel layer to facilitate adherence to the surface of the vessel before said fully curing step.

6. A method according to claim 1, further comprising the step of warming the vessel before said applying step.

7. A method according to claim 1, wherein said step of mixing together a polymeric adhesive and a curing agent comprises mixing together a two-part polyether based urethane adhesive with methylene bis-methyl anthranilate.

8. A method according to claim 1, further comprising the step of cutting the polymeric gel layer and carrier films into strips before said applying step.

9. A method according to claim 8, wherein said applying step comprises applying the strips in a laterally adjacent arrangement.

10. A method according to claim 9 comprising the further step of walking on the strips after said applying step.

11. A method according to claim 9, wherein said applying step comprises overlapping the strips and fusing adjacent strips together.

12. A method according to claim 1, wherein said fully curing step comprises curing the polymeric gel layer at a temperature between about 60° and 80° F.

13. A method according to claim 1, further comprising the step of degassing the polymeric composition before said introducing step.

14. A method according to claim 1, further comprising the step of manually applying pressure to the second carrier film to force any air bubbles between the polymeric gel layer and the surface of the vessel to migrate to the edge of the barrier liner for removal.

15. A method according to claim 1, further comprising the step of grit blasting the surface of the vessel to remove any resinous gloss before said applying step.

16. A method according to claim 1, further comprising the step of applying a coating of liquid polymeric adhesive to the surface of the vessel to form a rub coat before said step of applying the polymeric gel layer.

17. A method according to claim 16, further comprising the step of curing the rub coat before said step of applying the polymeric gel layer.

18. A method of preparing a barrier liner for a fluid vessel, wherein said method comprises the steps of:

advancing a first carrier film towards a first sizing roller;

advancing a second carrier film towards a second sizing roller spaced from the first sizing roller by a predetermined distance;

mixing together a polymeric adhesive and a curing agent to form a viscous polymeric composition which will become a barrier to fluids of the type contained in the vessel upon hardening;

introducing the polymeric composition between the first and second carrier films as the films are advanced towards the sizing rollers;

advancing the first and second carrier films and intermediate polymeric composition between the sizing rollers to compress the polymeric composition to a predetermined thickness between the carrier films; and partially curing the polymeric composition to form a gel layer.

19. A method according to claim 18, further comprising the step of cooling the polymeric gel layer to arrest polymerization after the partially curing step.

20. A method according to claim 19, wherein said cooling step comprises cooling the polymeric gel layer to about 40° F.

21. A method according to claim 18, wherein said partially curing step comprises curing the polymeric composition to a Shore hardness of about 15A to 20A.

22. A method according to claim 18, further comprising the step of degassing the polymeric composition before said introducing step.

* * * * *